United States Patent [19]

Gautier et al.

[11] 4,117,273
[45] Sep. 26, 1978

[54] SINGLE SIDED PROTECTOR FRAME FOR TELEPHONE CIRCUITS

[75] Inventors: Charles L. Gautier, Warren, N.J.; Paul V. DeLuca, Port Washington; Albert Atun, Valley Stream, both of N.Y.

[73] Assignee: Porta Systems Corp., Syosset, N.Y.

[21] Appl. No.: 843,716

[22] Filed: Oct. 20, 1977

[51] Int. Cl.² .......................... H04M 3/00; H01R 9/00
[52] U.S. Cl. .................................. 179/98; 339/18 R; 361/425
[58] Field of Search .................... 179/98, 91 R, 1 PC, 179/175, 175.2 R; 361/425–430; 339/18 R, 18 B, 18 C, 19, 150, 198

[56] References Cited

U.S. PATENT DOCUMENTS

| | | | |
|---|---|---|---|
| 3,518,611 | 6/1970 | Shores, Jr. | 361/428 |
| 3,760,328 | 9/1973 | Georgopoulos | 179/98 |
| 3,936,133 | 2/1976 | Splitt et al. | 339/198 R |
| 3,947,732 | 3/1976 | Cwirzen | 179/98 |
| 3,955,868 | 5/1976 | Kindermann et al. | 179/98 |
| 4,012,096 | 3/1977 | DeLuca et al. | 179/98 |
| 4,037,910 | 7/1977 | Paluch | 179/98 |
| 4,053,719 | 10/1977 | Debortoli et al. | 179/91 R |

Primary Examiner—Kathleen H. Claffy
Assistant Examiner—Gerald L. Brigance
Attorney, Agent, or Firm—Charles E. Temko

[57] ABSTRACT

A telephone frame characterized in having both the connector and protector terminals on one surface thereof. The protective devices are mounted at a lower part of the frame, with connector terminals disposed thereabove. Channels are provided to facilitate the entry of cables to the opposite side of the frame to permit the very high density in the number of connectors available per square inch. Connector blocks are mounted in horizontal rows to be completely surrounded by vertical and horizontal cable and conductor-carrying troughs to facilitate the use of short length jumpers.

2 Claims, 3 Drawing Figures

U.S. Patent  Sept. 26, 1978  Sheet 2 of 2  4,117,273
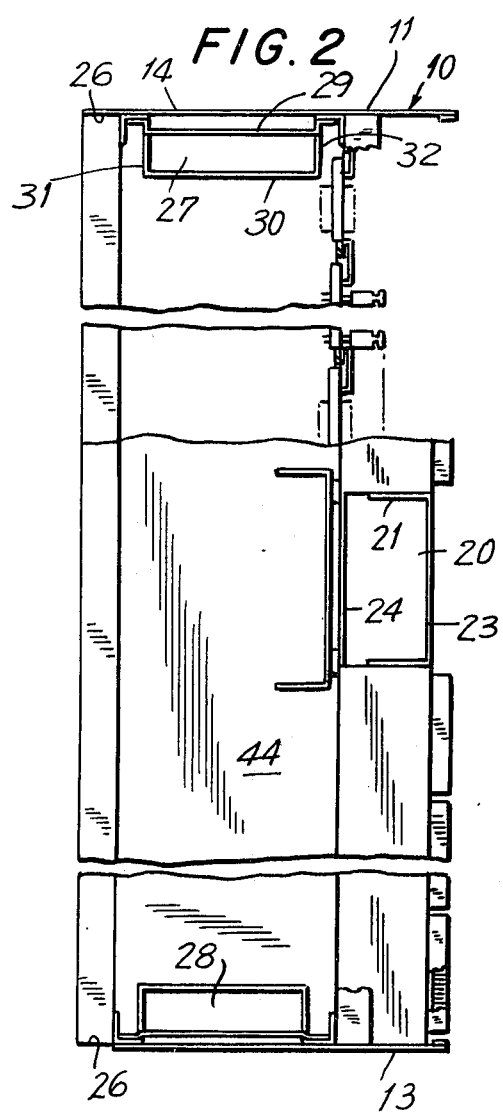
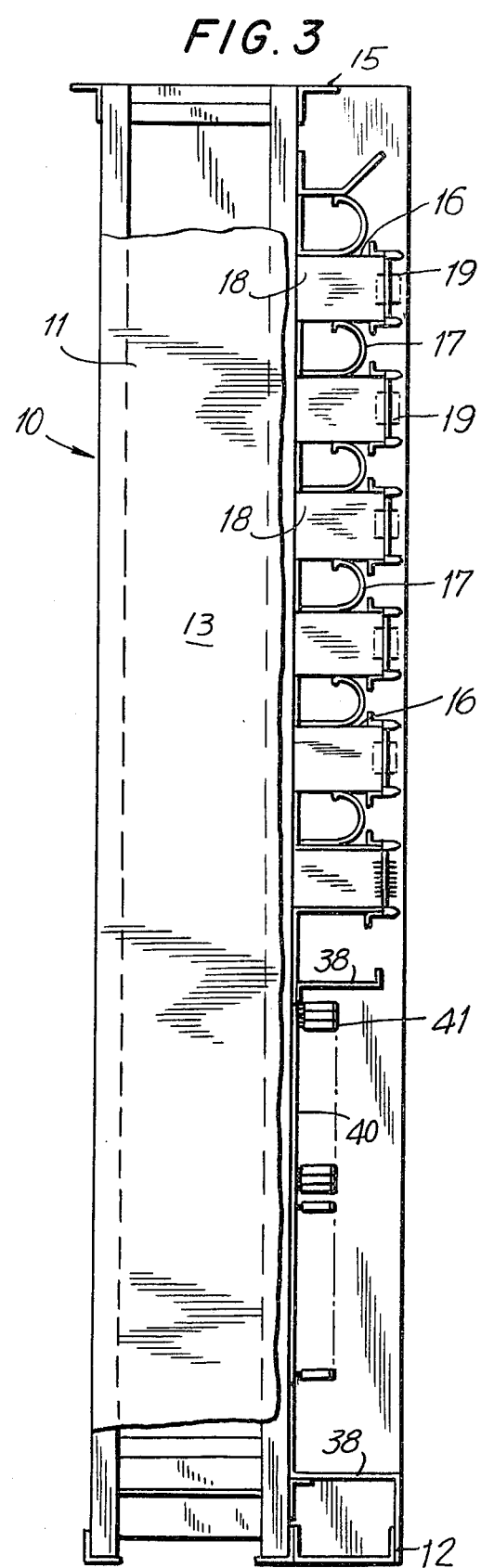

SINGLE SIDED PROTECTOR FRAME FOR TELEPHONE CIRCUITS

BACKGROUND OF THE INVENTION

This invention relates generally to the field of telephony, and more particularly to an improved single sided frame construction by mounting connector and protector blocks in close proximity to be readily available on a single side of the frame.

With the constant growth of subscribers in a given telephone office, the problems of accommodation of ever growing connector pairs is constant. The known art includes many forms of main frames adapted to provide high space utilization with maximum connector pair density, while still providing adequate accessibility for servicing. To obtain such advantages, it is customary to provide connector blocks in which availability of terminals is possible only by providing protector terminals on one side of the frame and connector terminals on the opposite side. It follows that a corridor must be provided to allow accessibility to each side of the frame. While it is, of course, possible to have a plurality of such frames disposed upon a plant floor in a mutually parallel relation, such arrangement precludes maximum space utilization possible by mounting frames against vertical walls or other areas where accessibility on one side only is possible. In the case of two sided frames, expansion in co-planar fashion is difficult because of the lack of troughs and passages for jumpering and the accompanying difficulty of tracing connections.

SUMMARY OF THE INVENTION

Briefly stated, the invention contemplates the provision of an improved telephone frame of the class described in which both connector and protector terminals are positioned on a single side of the frame, the protector terminals being disposed at a lower part of the frame for adequate availability, and the connector terminals being positioned thereabove in areas where they are readily available for servicing without the necessity of stooping or mounting a ladder. The connector blocks of known type are mounted in horizontal rows and separated by horizontal troughs to permit accessibility from above or below. Vertical cable troughs communicate with the horizontal troughs to permit the convenient interconnection of frames on a row to row basis, and to other adjacent groups of blocks on adjacent frames.

BRIEF DESCRIPTIONS OF THE DRAWINGS

In the drawings, to which reference will be made in the specification, similar reference characters have been employed to designate corresponding parts throughout the several views.

FIG. 2 is a fragmentary top plan view thereof.

FIG. 3 is a fragmentary side elevational view thereof.

DETAILED DESCRIPTION OF THE DISCLOSED EMBODIMENT

Figure 1:
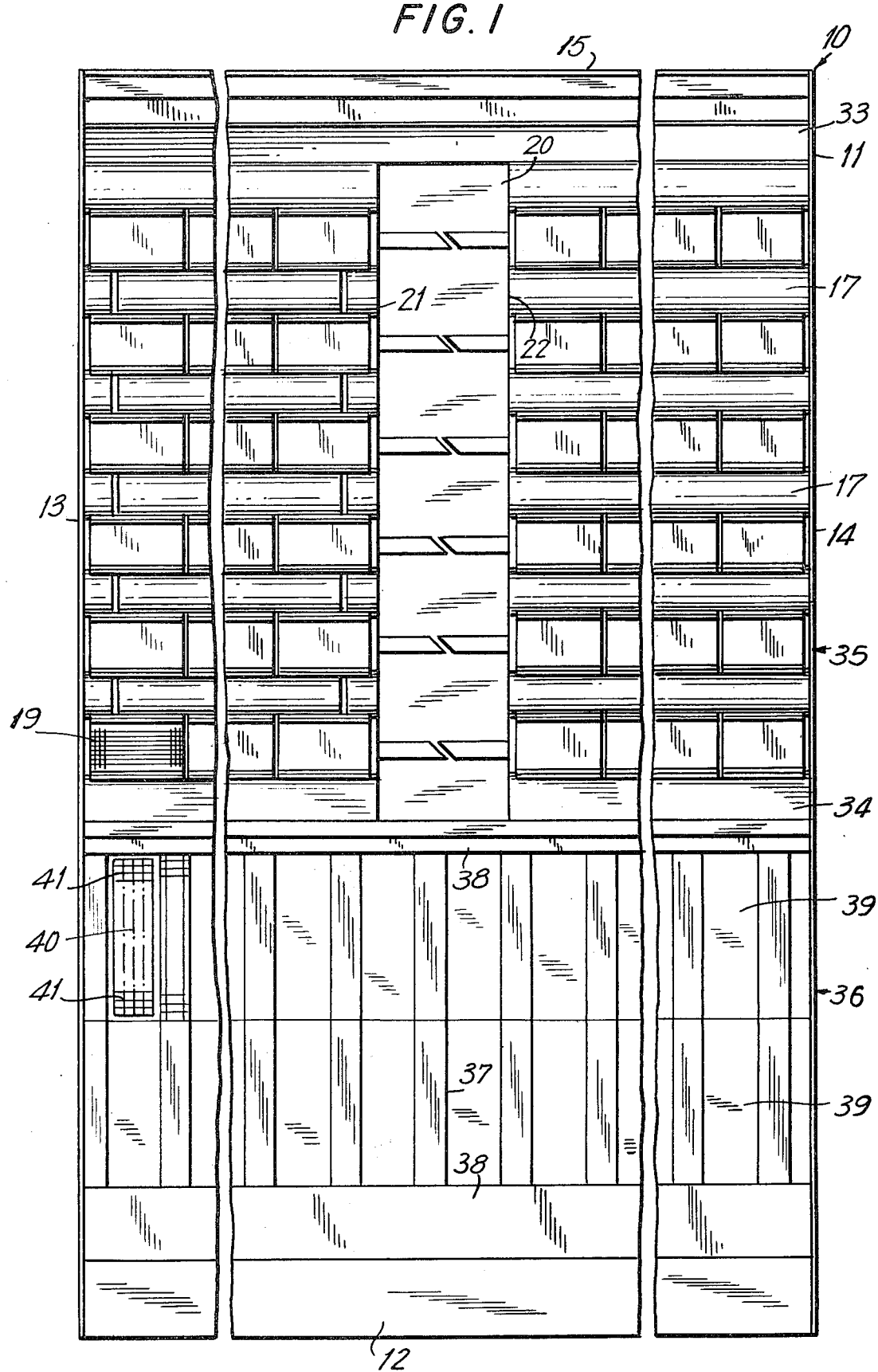
FIG. 1 is a fragmentary front elevational view of an embodiment of the invention.

In accordance with the invention, the device, generally indicated by reference character 10, includes a frame element 11. The frame element 11 comprises a lower horizontal frame member 12, vertical members 13 and 14, and an upper horizontal member 15. Disposed between the vertical members are a plurality of horizontal shelf members 16 separated by horizontal trough forming members 17. Openings 18 between the shelf members accommodate known terminal blocks 19 in generally horizontal orientation.

Communicating with the terminal blocks are vertical jumper troughs 20 formed by side walls 21 and 22, an outer wall 23 and an inner wall 24. The inner surfaces 26 of the members 13 and 14 support vertical cable troughs 27 and 28, each including an outer wall 29, an inner wall 30, and side walls 31 and 32. Upper and lower horizontal troughs 33 and 34 provide for horizontal communication between blocks, groups of blocks and adjacent frames (not shown).

Disposed beneath the upper area of the frame, generally indicated by reference character 35 is a lower area 36 inwardly indented with respect to the upper area. The lower area 36 is bounded by vertical members 37, and horizontal members 38 forming recesses 39 for the accommodation of vertically-oriented protector blocks 40 of known type engaging detector modules 41.

In the preferred form, the lower area 36 does not extend more than 32 inches from the floor, reserving all of the usable area above that limit for installation of connector blocks.

As best seen in FIG. 2, adequate space is provided, as indicated by reference character 44 for the leading conductors (not shown) to the connector blocks, and once these connections have been made, the frame element 11 may be installed against a wall, as further access to these interconnections is not normally required.

It will thus be seen that we have invented novel and highly useful improvements in single sided protector frame elements for telephonic installations, which allow full usage of the available space within a telephone office, including such areas as immediately adjacent a vertical wall, between pillars or posts, or in back to back relation with a similar single sided frame. By confining the protector connections to the lower portion of the frame, maximum space is available for installation of connector blocks, it being possible to access all of the blocks without excessive stooping or resort to the use of a ladder. Thus, not only is maximum space utilization accomplished, but without substantial sacrifice of accessibility.

We wish it to be understood that we do not consider the invention limited to the precise details of structure shown and set forth in this specification, for obvious modification will occur to those skilled in the art to which the invention pertains.

We claim:

1. An improved telephone frame construction comprising: a vertically oriented frame element including a plurality of vertically and horizontally oriented frame members, said frame members defining a first plurality of upper block mounting areas and a second plurality of lower block mounting areas on a single vertical side of said frame element; a plurality of connector blocks mounted within said upper area, a plurality of protector blocks mounted within said lower area, a plurality of vertically oriented cable troughs positioned between said upper areas, and a plurality of horizontal cable troughs disposed above and below said upper block mounting areas; and at least one jumper trough communicating with each of said horizontal cable troughs; said frame element defining an open area for accommodating conductors interconnecting terminals on said connector blocks and said protector blocks.

2. Frame construction in accordance with claim 1, further characterized in said protector blocks being inwardly recessed relative to said connector blocks.

* * * * *